July 9, 1963 G. OTTEN ETAL 3,097,235
PROCESS FOR THE MANUFACTURE OF 1,3-BENZENE-DISULFONIC ACID
Filed Sept. 6, 1961
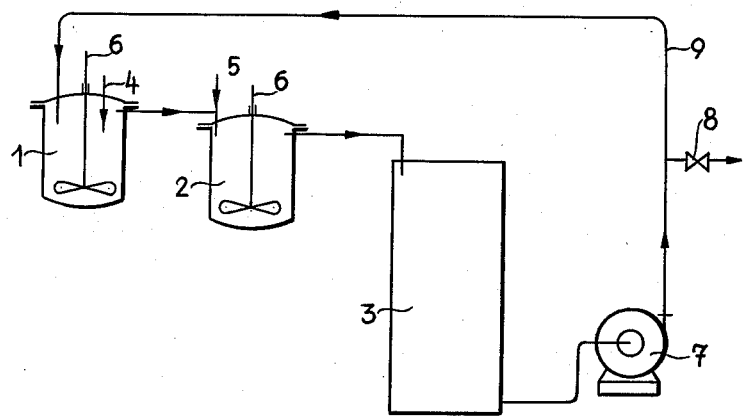
INVENTORS
GERHARD OTTEN
OTTO SCHERER
HEINZ SCHILD
BY Curtis, Morris & Safford
ATTORNEYS 3,097,235
PROCESS FOR THE MANUFACTURE OF 1,3-
BENZENE-DISULFONIC ACID
Gerhard Otten, Otto Scherer, and Heinz Schild, Frankfurt am Main, Germany, assignors to Farbwerke Hoechst Aktiengesellschaft vormals Meister Lucius & Brüning, Frankfurt am Main, Germany, a corporation of Germany
Filed Sept. 6, 1961, Ser. No. 136,321
Claims priority, application Germany June 13, 1957
5 Claims. (Cl. 260—505)

This application is a continuation-in-part application to our copending application Serial Number 738,422, filed May 28, 1958, now abandoned.

The present invention relates to a process for the manufacture of 1,3-benzene-disulfonic acid.

It has already been proposed to produce 1,3-benzene-disulfonic acid by sulfonating benzene. In this process benzene is reacted in a first reaction stage with concentrated sulfuric acid to obtain benzene-monosulfonic acid. The benzene-monosulfonic acid which is obtained in admixture with excessive sulfuric acid is then converted in a second stage by reacting it with 65% fuming sulfuric acid to 1,3-benzene-disulfonic acid. This process is beset with various disadvantages. It necessitates a great excess of sulfuric acid—about 3 mols of excessive sulfuric acid per mol of benzene-disulfonic acid—an excess that must be removed, in most cases, by addition of a calcium salt, and this removal must be made prior to the isolation of 1,3-benzene-disulfonic acid.

It is also known to produce 1,3-benzene disulfonic acid by absorbing sulfur trioxide, which may be rarefied with an inert gas or air, in benzene-monosulfonic acid. Benzene is added as soon as a certain sulfur trioxide concentration has been reached and benzene-monosulfonic acid is obtained. In a second stage sulfur trioxide is again dissolved in benzene-monosulfonic acid, the solution is heated and 1,3-benzene-disulfonic acid is obtained. (U.S. Patent 2,807,641.) This process, especially in the second stage, implies the formation of a considerable amount of undesired by-products, for example diphenyl-sulfonic acids. The proportion of by-products obtained may be as high as 20%, so that the resulting 1,3-benzene-disulfonic acid is strongly contaminated.

Now we have found that pure 1,3-benzene-disulfonic acid can be produced in a simple manner with a good yield and in one stage either discontinuously or preferably continuously by reaction sulfur trioxide and benzene at a temperature above 100° C. in a sulfonated reaction mixture.

As sulfonated reaction mixtures there may be used those which are obtained by known processes and contain 1,3-benzene-disulfonic acid and sulfuric acid. As a reaction medium there may also be employed the reaction mixture obtained by the process of the invention, which mixture contains 1,3-benzene-disulfonic acid and a small amount of sulfur trioxide.

The reaction is carried out as follows: gaseous or preferably liquid sulfur trioxide is dissolved in a minor concentration in the sulfonated reaction mixture so that about 40–100 parts by volume, preferably 70–90 parts by volume of sulfonated reaction mixture (mainly benzene-disulfonic acid) are used per part by volume of sulfur trioxide, calculated as liquid sulfur trioxide. Benzene is then added to the solution of sulfur trioxide in 1,3-benzene-disulfonic acid at a temperature above 100° C., normally at a temperature between about 100° C. and 160° C., preferably between about 120° C. and 140° C., and in an amount such that about 2–2.5 mols, preferably 2.2 mols of sulfur trioxide are used per mol of benzene.

As compared with the older process carried out in two stages, the process of the invention has not only the advantage that it enables 1,3-benzene-disulfonic acid to be obtained from benzene and sulfur trioxide in a single stage, but it offers also the advantage that a constant reaction temperature can be used. In the older two-stage process, sulfur trioxide is first dissolved at the beginning of the second stage at a low temperature in the benzene-monosulfonic acid prepared after the first reaction stage and the solution so obtained has then to be heated to the sulfonation temperature, whereas in the process of the invention the sulfur trioxide is dissolved at the sulfonation temperature in the sulfonated mixture serving as the reaction medium.

An apparatus suitable for use in carrying out the invention is shown diagrammatically in the accompanying drawing.

In the reaction vessel 1 the sulfur trioxide is introduced through inlet 4, preferably in the liquid state, under the surface of the sulfonated reaction mixture which is vigorously stirred by agitator 6. If the sulfonated reaction mixture has been prepared by a known process, it is concentrated in the course of the entire reaction until it contains an acid of 90% strength, whereas a sulfonated reaction mixture obtained by the process of this invention already contains a 90–95% 1,3-benzene-disulfonic acid. In the reaction vessel 2, which is provided too with a stirrer 6 to ensure good mixing, benzene is added through inlet 5 and preferably introduced under the surface of the sulfur trioxide solution. Reaction vessel 3 serves to regulate the time necessary to complete the reaction; this time depends on the temperature used and is within about 10–65 minutes. Reaction vessels 1 to 3 are kept at the necessary temperature by measures known in the art, a constant temperature being preferred. Pump 7 serves to circulate the reaction mixture via conduit 9 to vessel 1. Vessels 1 and 2 or 2 and 3 may be connected together by an overflow valve or a pump. The end product is withdrawn through valve 8. The quantity of product withdrawn in a continuous operation is about equal to the amount of sulfur trioxide and benzene introduced into vessels 1 and 2. Sulfur trioxide is preferably added in a quantity such that the circulating and reacted sulfonation mixture contains still about 3% by weight of sulfur trioxide. It is of course also possible to add sulfur trioxide in a smaller amount, but this implies a longer reaction period. Any excessive sulfur trioxide contained in the end product withdrawn may be expelled in known manner for example by means of air.

The quantity of circulating reaction mixture should be so determined that about 40–100 parts by volume, preferably about 80 parts by volume, of reaction mixture are used per part by volume of liquid sulfur trioxide to be reacted. It is also possible to add sulfur trioxide, calculated as liquid sulfur trioxide, and benzene simultaneously or successively into the same reaction vessel.

In order to produce as pure a product as possible, it is advantageous to carry out the reaction in known manner in the presence of a sodium salt, for example sodium sulfate or the sodium salt of 1,3-benzene-disulfonic acid. The sodium salt is usually used in a proportion of between about 3–15% by weight of all reactants. Prior to the reaction, the sodium salt is dissolved in the reaction mixture, for example in a vessel connected with reaction vessel 1.

The process of the invention is especially suitable for preparing 1,3-benzene-disulfonic acid continuously, and it may also be used for the treatment of a reaction mixture with a low content of 1,3-benzene-disulfonic acid so as to increase the concentration of the latter. The invention furthermore enables a very pure and concentrated

Example 1

A sulfonated mixture containing 65% by weight of sulfuric acid, 5 percent by weight of sodium 1,3-benzene-disulfonate, balance 1,3-benzene-disulfonic acid was repumped in the apparatus shown in the drawing. Repumping took place at a rate of 17 liters per hour. The time of stay in the apparatus was 15 minutes and the temperature 135–140° C. Sulfur trioxide was added at a rate of 400 grams (=217.5 ccm., calculated as liquid sulfur trioxide) per hour and benzene at a rate of 177 grams (=202 ccm., calculated as liquid benzene) per hour. 570–580 grams of substance were withdrawn per hour. The mixture withdrawn after 50 hours contained 92% by weight of 1,3-benzene-disulfonic acid.

Instead of the sodium salt of 1,3-benzene-disulfonic acid, sodium sulfate may also be used in an amount such that it appears in the total mixture in a concentration of about 10–15% by weight.

Example 2

The reaction was started with the 1,3-benzene-disulfonic acid (92% by weight) obtained as described in Example 1. Benzene and sulfur trioxide were added in the manner and under the conditions described in the preceding example. The time of reaction was 48 hours. The mixture withdrawn contained 90–94% by weight of 1,3-benzene-disulfonic acid and 0.1–0.3% by weight of benzene-monosulfonic acid.

Example 3

Examples (a) and (b) show that in the known two-stage process using a low proportion by volume of sulfonated mixture:sulfur trioxide which is far below 40:1, considerably larger amounts of undesirable by-products are formed than in the one-stage process of the invention in which the proportion by volume of sulfonated mixture: sulfur trioxide is within the range of 40:1 to 100:1.

(a) Into a 1-liter round-bottomed flask provided with a high-efficiency stirrer 239 ccm. of a mixture consisting of 88.8% by weight of benzene-monosulfonic acid and 11.2% by weight of the sodium salt of benzene-monosulfonic acid were introduced and heated to 55° C. In the course of about 1 hour, 87.4 ccm. of liquid sulfur trioxide was run in, while stirring, the temperature rising slowly from 55° C. to at most 100° C. The proportion by volume of sulfonated mixture:liquid sulfur trioxide in the mixture so obtained was 2.7:1. According to analysis, the mixture had the composition 1 indicated below. The mixture was then heated to 180° C. and kept at that temperature for 2 hours. Analysis showed that the reaction mixture so obtained had the composition 2.

|  | 1 | 2 |
|---|---|---|
|  | Percent | Percent |
| Benzene-monosulfonic acid | 57.5 | 5.15 |
| 1,3-benzene-disulfonic acid | 9.75 | 76.3 |
| Sulfonic acids of diphenylsulfone | 0.8 | 10.4 |
| Diphenylsulfone | 1.76 |  |
| Sulfur trioxide | 28.75 | 6.3 |
| Sodium | 0.94 | 0.94 |
| By-products not determinable by analysis | 0.5 | 0.91 |

(b) The experiment was carried out as described in Example 2 with the exception that the reaction mixture contained 7.1% by weight of sodium sulfate instead of sodium 1,3-benzene sulfonate. The proportion by volume of sulfonated mixture to liquid trioxide accordingly amounted to about 80:1. After reaction, the mixture had the following composition as determined by analysis:

| | Percent |
|---|---|
| 1,3-benzene-disulfonic acid | 83.6 |
| Sulfonic acids of diphenylsulfone | 4.3 |
| Sulfur trioxide | 4.4 |
| Sodium sulfate | 7.1 |
| By-products not determinable by analysis | 0.6 |

The analytical results were ascertained by ultraviolet spectroscopy.

We claim:

1. The process for preparing 1,3-benzene-disulfonic acid which comprises dissolving sulfur trioxide in a liquid sulfonated reaction mixture consisting essentially of 1,3-benzene-disulfonic acid at a temperature in the range from about 100° C. to about 160° C., and in such an amount that one part by volume of sulfur trioxide, calculated as liquid sulfur trioxide, is used for about 40 to 100 parts by volume of said sulfonated reaction mixture, and then reacting the resulting mixture at a temperature in the same range with benzene in such amount that about 2 to 2.5 moles of sulfur trioxide are used for each mole of benzene.

2. The process for preparing 1,3-benzene-disulfonic acid which comprises dissolving sulfur trioxide in a liquid sulfonated reaction mixture consisting essentially of 1,3-benzene-disulfonic acid at a temperature in the range from about 100° to about 160° C. and in such an amount that one part by volume of sulfur trioxide, calculated as liquid sulfur trioxide, is used for about 40 to 100 parts by volume of said sulfonated reaction mixture, and then reacting the resulting mixture at a temperature in the same range with benzene in such amount that about 2 to 2.5 moles of sulfur trioxide are used for each mole of benzene, in the presence of a sodium salt selected from the group consisting of sodium sulfate and sodium-1,3-benzene-disulfonate.

3. The process as in claim 2 wherein said sodium salt has a concentration from about 3 percent to about 15 percent by weight of all reactants.

4. The process as in claim 1 wherein, on initiation of said process, sulfur trioxide is dissolved in a medium comprising sulfuric acid and 1,3-benzene-disulfonic acid, whereby said liquid sulfonated reaction mixture of claim 1, consisting essentially of 1,3-benzene-disulfonic acid, is produced.

5. The process as claimed in claim 1, wherein the reaction is carried out at a temperature in the range from about 120° to about 140° C.

References Cited in the file of this patent

UNITED STATES PATENTS 2,807,641    Milner et al.    Sept. 24, 1957

FOREIGN PATENTS 1,197,233    France    June 1, 1959